United States Patent [19]

Wong

[11] Patent Number: 5,034,857
[45] Date of Patent: Jul. 23, 1991

[54] POROUS ELECTROLYTIC ANODE

[75] Inventor: James Wong, Wayland, Mass.

[73] Assignee: Composite Materials Technology, Inc., Shrewsbury, Mass.

[21] Appl. No.: 417,929

[22] Filed: Oct. 6, 1989

[51] Int. Cl.⁵ .......................... H01G 9/05; H01L 39/24
[52] U.S. Cl. ...................................... 361/509; 29/599
[58] Field of Search ............... 361/508, 509, 528, 529; 29/599, 570.1; 437/919

[56] References Cited

U.S. PATENT DOCUMENTS 3,277,564 10/1966 Webber et al. .................. 29/599 X
3,540,114 11/1970 Roberts et al. .................. 29/599 X
3,742,369 6/1973 Douglass ............................ 361/529
3,800,414 4/1974 Shattes et al. ...................... 29/599
4,674,009 6/1987 Wong .................................. 361/529

Primary Examiner—Donald A. Griffin
Attorney, Agent, or Firm—Hayes, Soloway, Hennessey & Hage

[57] ABSTRACT

Porous electrodes are formed of multiple, spaced filaments of tantalum derived from reduction of a softer metal billet containing elongated spaced, substantially parallel wires of the valve metal, removing the softer metal, and affixing a contact thereto.

7 Claims, 1 Drawing Sheet

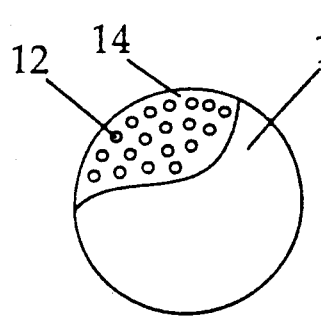
FIG. 1A
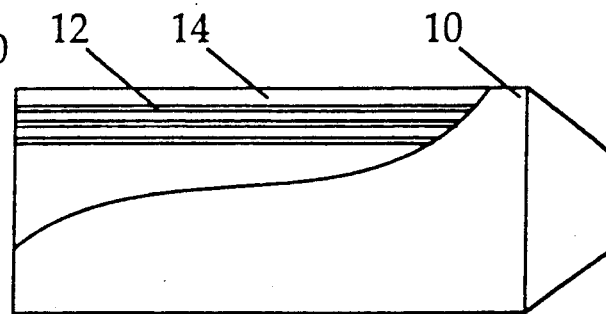
FIG. 1
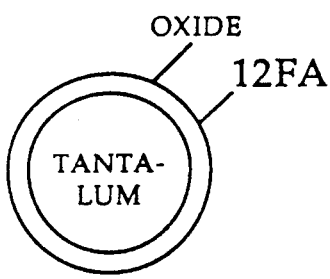
FIG. 3A
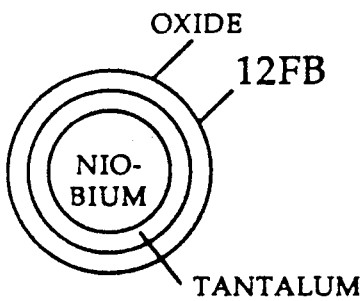
FIG. 3B
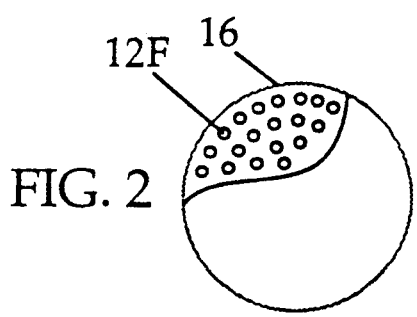
FIG. 2
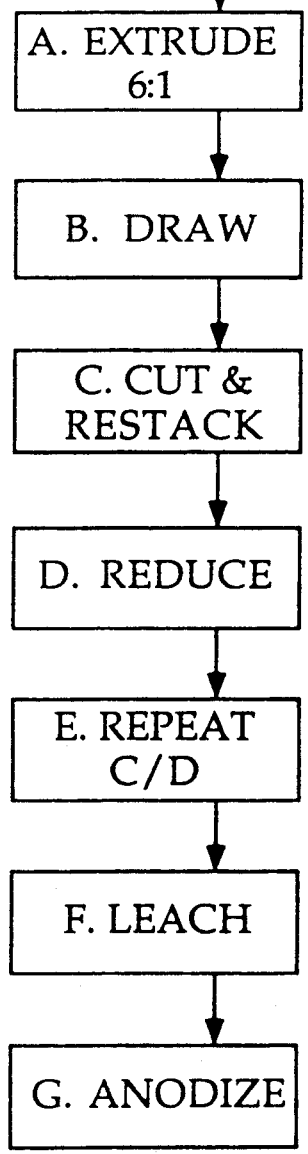

POROUS ELECTROLYTIC ANODE

BACKGROUND OF THE INVENTION

The present invention relates to porous metal compacts suitable for manufacture of electrolytic process and electrodes (e.g., as an anode of a solid state electrolytic capacitor), filtration, and the like. The present invention also relates to steps for making such compacts.

The state of the art for such compacts is that they are made of sintered powders. The art has difficulty in producing high purity powders and in controlling sinter conditions to achieve a high degree of effective porosity, reliably. Artifacts of metal flakes and fibers attempted in the past have not overcome these difficulties.

It is a principal object of the invention to overcome those difficulties.

SUMMARY OF THE INVENTION

According to the present invention, a metal usable in such a compact (e.g., tantalum, niobium, and their alloys) are formed as hundreds to thousands of rods or wires in a softer metal (e.g., copper, aluminum, lead), billet and reduced through high area reduction to form the billet to a wire or ribbon or other low area cross-section. Alternatively the wires can comprise a core of any one or more of iron, nickel, silicon, phosphorous, titanium, aluminum, zirconium, molybdenum or tungsten with a coating of tantalum or niobium or alloy thereon or a niobium core with a tantalum coating. The original wires are thus formed into filaments of 0.2 to 5.0 microns diameter in the course of billet reduction, and controllably so, without losing size control or suffering significant contamination of the filaments during the reduction. The soft metal is then removed (e.g., by leaching). The compacts are cut into short lengths (buttons). The resultant button compact of filaments can be bonded to a conductor or other mechanical/electrical support to serve as an anode in electrolytic devices, such as a solid electrolyte capacitor.

Before leaching the soft matrix out, the composite can be flattened to produce a flat mat on leaching. The original multi-wire billet can include wires with a twist impacted during working, in accordance with known techinques of producing multi-filament niobium alloys in a copper matrix for a.c. superconductor use. Such twisted wires can comprise a stable compact after leaching out the copper—thereby avoiding the need for subsequent compactin/sintering.

The round or flat button compacts of filaments produced after leaching are characterized by controlled uniform sizes, controlled porosity and high surface-to-volume and surface-to-weight ratios compared to porous sintered powder compacts of the same metal.

The button compacts are accessible by liquids and by solids precursors which penetrate quickly via capillary action from exposed faces and edges.

The diameter reduction ratio of the billet and contained wires is at least 50:1 affording an area reduction of 2,500:1. Preferrably substantially higher reduction ratios are effected.

The practice of the invention can comprise production of tantalum filaments of 0.5 microns diameter. Such a filament would have a theoretical surface area (assuming a smooth cylinder) of 0.482 square meters per gram—compared to 0.723 square meters per gram for an assumed tantalum sphere of 0.5 microns diameter. In both the filament and sphere cases, micro-roughness can add some effective area and a larger diameter sphere (e.g., 1.0 microns) would have less surface area per gram. The advantages of the filaments over the 'corresponding' sphere include:

(a) greater ease of fabricability;

(b) greater reliability in reaching a high surface area condition where high effective surface area is attained—and maintained during high temperature sinter processes;

To elaborate the last point, modern fine powders are fabricated with anodes which achieve 20,000–30,000 microfarad volts per gram specific capacitance, but only when the anodes are produced at 1,400°–1,700° C. sinter temperatures (rather than the 1,800°–2,000° C. range which would be preferred to safeguard against weak bonding or other degradation). The filaments can be made into anode compacts at sinter temperatures of 1,800°–2,000° C. and the compacts can provide the 20,000–30,000 cv/gm performance.

(c) avoidance in the filaments of a high degree of oxygen pickup—a virtually inevitable concomitant of powder production at sub-micron diameter ranges;

(d) avoidance in the filaments of the need for dopants—a common artifact of high capacitance powder;

(e) achieving in the filamentary mat a substantially uniform inter-filament of controlled/predictable porosity and infiltration characteristics for anodizing liquid and for liquid precursors of solid electrolyte;

(f) higher surface area retention efficiency in sintering of a filamentary mass of uniform size and cross-section type compared to (powder) particles of a higher degree of non-uniformity of cross section.

Filament production of refractory metals is disclosed in U.S. Pat. Nos. 3,277,564 (Webber), 3,379,000 (Webber), 3,394,213 (Roberts), 3,567,407 (Yoblin), 3,698,863 (Roberts), Douglass (3,742,369) and Fife (4,502,884) dealing with usage of the resultant compacts as electrolytic capacitor anodes. None of these or many other related or like references have yielded a commercially effective anode product.

DRAWINGS AND PREFERRED EMBODIMENTS

The drawings comprise:

FIGS. 1 AND 1A (reduction process artifacts and flow chart);

FIG. 2 (product cross section sketch of the composite); and

FIGS. 3A and 3B (cross-sections of filaments).

FIG. 1 shows a longitudinal section, with an end view (FIG. 1A) projection which is partly sectioned, a copper billet 10 typically of six inch to a foot in diameter, drilled to include one hundred longitudinal holes 12 of 0.3–0.31 inch diameter. A hundred of 0.3 inch diameter tantalum filaments or tantalum coated niobium filaments is inserted into the holes. The billet is sealed and extruded through a 6:1 reduction (diameter basis). Then the composite rod product of billet extrusion is drawn until the component rods are thereby reduced to about 100 micron filaments. Then the composite rod product is cut to one foot lengths which are arrayed side by side into a new billet which can be extruded and/or drawn (and the process can be repeated) to attain 0.5–5.0 micron filament diameter. The resultant composite is treated to leach out the copper and then anodized.

FIG. 2 shows the resultant mat 16 of filaments 12F (derived from rods 12) in cross section with essentially uniform size and spacing in the partial cross section of FIG. 2—and in each other cross section which could be taken along the length of mat 11.

FIGS. 3A and 3B show the resultant filaments 12F per two embodiments—where the filament is of tantalum (3A) or of tantalum (TA) coated niobium (NB) (3B). In either case an external tantalum pentoxide (OX) layer is formed anodically. The mat can be reimpregnated with solid electrolyte precursor and fitted with a counter-electrode and packaged pursuant to conventional capacitor technology.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctine of equivalents.

What is claimed is:

1. Porous electrolytic electrode compact as made by establishing multiple substantially longitudial tantalum metal components in a billet of a softer metal, working the composite billet through a diameter reduction of at least 50:1 to form the said components into filaments with controlled spacing and orientation relative to each other derived from the original billet arrangement, each said filament having a diameter less than 5 micron, and being substantially uniform in diameter throughout its length, all said filaments having substantially equal diameters and removing the softer metal of the billet, oxidizing the filament surfaces to form adherent, continuous coatings of oxides on the filaments.

2. Method of utilizing the porous compact of claim 1 comprising use as an electrolytic system anode and dielectric.

3. Method in accordance with claim 2 and further comprising establishing an electrolyte and counter-electrode (cathode) to the anode.

4. Method in accordance with claim 3 wherein the electrolyte is solid.

5. Product in accordance with claim 1 wherein a helical twisting of the filaments is made after diameter reduction to restrain scattering of the filaments as the matrix is removed.

6. A capacitor as in claim 5 wherein the filaments comprise a tantalum coating on a niobium core.

7. An electrolytic capacitor comprising an anode formed of a mat of tantalum filaments of uniform diameter within a range of 0.5 to 5.0 microns and having a specific capacitance of over 15,000 cv/gm achieved at sinter temperatures of over 1,700° C.

* * * * *